United States Patent
Park et al.

(10) Patent No.: US 9,628,570 B2
(45) Date of Patent: Apr. 18, 2017

(54) METHOD AND APPARATUS FOR SHARING DATA BETWEEN DIFFERENT NETWORK DEVICES

(75) Inventors: Min Kyu Park, Seoul (KR); June Seok Kim, Seoul (KR); Joong Hun Kwon, Seoul (KR); Kyu Sung Kim, Seoul (KR); Min Hyuk Kim, Seoul (KR); Jin Ha Seong, Seoul (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 476 days.

(21) Appl. No.: 13/468,479

(22) Filed: May 10, 2012

(65) Prior Publication Data

US 2012/0287034 A1 Nov. 15, 2012

(30) Foreign Application Priority Data

May 11, 2011 (KR) ........................ 10-2011-0044072

(51) Int. Cl.
*H04L 29/08* (2006.01)
*H04L 12/28* (2006.01)
(Continued)

(52) U.S. Cl.
CPC ............ *H04L 67/16* (2013.01); *G06F 3/0488* (2013.01); *H04L 12/2807* (2013.01);
(Continued)

(58) Field of Classification Search
CPC . H04L 12/2807; H04L 67/16; H04L 12/2809; G06F 3/04842; G06F 3/04817;
(Continued)

(56) References Cited

U.S. PATENT DOCUMENTS 6,246,409 B1 * 6/2001 Veghte et al. ................ 715/738
7,181,511 B1 2/2007 Grenier et al.
(Continued)

FOREIGN PATENT DOCUMENTS

CN 101529437 A 9/2009
CN 101828186 A 9/2010
(Continued)

OTHER PUBLICATIONS

Russian Search Report dated May 25, 2016.
(Continued)

*Primary Examiner* — Alexander Eisen
*Assistant Examiner* — Abhishek Sarma
(74) *Attorney, Agent, or Firm* — Cha & Reiter, LLC

(57) ABSTRACT

Disclosed are a user interface for a data sharing function according to network connection between network electronic devices and a user device for operating a data sharing function using same. The method for sharing data between network electronic devices, includes: searching network electronic devices located at a periphery of a user device when an input for performing a data sharing function is sensed; classifying the searched network electronic devices into transmission side network electronic devices and reception side network electronic devices; allotting the searched network electronic devices to a first region for receiving data and a second region for transmitting the data, respectively; and configuring and displaying a user interface for a data sharing function based on the network electronic devices allotted to the first region and the second regions.

14 Claims, 13 Drawing Sheets

(51) Int. Cl.
*G06F 3/0488* (2013.01)
*H04W 4/00* (2009.01)
*H04W 8/00* (2009.01)

(52) U.S. Cl.
CPC ........... *H04L 12/2809* (2013.01); *H04W 4/00* (2013.01); *H04W 8/005* (2013.01)

(58) Field of Classification Search
CPC ...... G06F 3/0482; G06F 3/017; G06F 3/0485; G06F 3/0488; H04W 8/005; H04W 4/00
USPC .................................................. 345/173–174
See application file for complete search history.

(56) References Cited

U.S. PATENT DOCUMENTS

| | | |
|---|---|---|
| 8,077,157 B2 | 12/2011 | Sengupta et al. |
| 2005/0027673 A1 | 2/2005 | Moritani et al. |
| 2005/0044108 A1 | 2/2005 | Shah et al. |
| 2005/0091289 A1 | 4/2005 | Shappell et al. |
| 2005/0218739 A1 | 10/2005 | Maddin et al. |
| 2006/0053388 A1 | 3/2006 | Michelman |
| 2006/0242259 A1 | 10/2006 | Vallabh et al. |
| 2006/0242581 A1 | 10/2006 | Manion et al. |
| 2008/0052945 A1* | 3/2008 | Matas et al. ............... 34/173 |
| 2008/0235731 A1 | 9/2008 | Bryant et al. |
| 2009/0156123 A1* | 6/2009 | Kim .................. H04M 1/7253 455/41.2 |
| 2009/0244015 A1* | 10/2009 | Sengupta et al. ............. 345/173 |
| 2009/0282124 A1 | 11/2009 | Rauhala et al. |
| 2010/0211636 A1 | 8/2010 | Starkenburg et al. |
| 2010/0318928 A1* | 12/2010 | Neuman et al. ............. 715/769 |
| 2011/0047466 A1 | 2/2011 | Michelman |
| 2011/0091183 A1 | 4/2011 | Nakamura |
| 2011/0134465 A1* | 6/2011 | Gha ....................... G06F 3/1221 358/1.15 |
| 2011/0197147 A1* | 8/2011 | Fai ......................... G06F 1/1639 715/753 |
| 2012/0070085 A1* | 3/2012 | Arn ................................ 382/173 |
| 2012/0194465 A1* | 8/2012 | Gronow ............... G06Q 10/107 345/173 |

FOREIGN PATENT DOCUMENTS

| | | |
|---|---|---|
| JP | 2005-044104 A | 2/2005 |
| JP | 2009-146357 A | 7/2009 |
| JP | 2010-505351 A | 2/2010 |
| JP | 2010-524281 A | 7/2010 |
| JP | 2011-90461 A | 5/2011 |
| KR | 10-2005-0060783 A | 6/2005 |
| KR | 10-2008-0087997 A | 10/2008 |
| KR | 10-2011-0044072 A | 4/2011 |
| KR | 10-1396967 B1 | 5/2014 |
| RU | 2 377 646 C2 | 7/2004 |
| RU | 2 374 681 C2 | 10/2004 |
| RU | 2 379 755 C2 | 3/2005 |
| RU | 2007 138 967 A | 4/2005 |
| WO | 2005/103874 A2 | 11/2005 |
| WO | 2005/103874 A3 | 2/2006 |

OTHER PUBLICATIONS

Chinese Search Report dated Jul. 5, 2016.
Japanese Search Report dated Jul. 25, 2016.
Australian Notice of Patent Grant dated Jan. 11, 2017.
Russian Notice of Patent Grant dated Jan. 16, 2017.

* cited by examiner

METHOD AND APPARATUS FOR SHARING DATA BETWEEN DIFFERENT NETWORK DEVICES

CLAIM OF PRIORITY

This application claims, pursuant to 35 USC 119, priority to, and the benefit of the earlier filing date of, that patent application filed in the Korean Intellectual Property Office on May 11, 2011 and afforded serial number 10-2011-0044072, the contents of which are incorporated by reference herein.

BACKGROUND OF THE INVENTION

Field of the Invention

The present invention relates to the field on networks and more particularly, although not exclusively, to a user interface capable of sharing data between network devices.

Description of the Related

With the development of digital technology and the applicability of digital technology to mobile communications, current mobile communication terminals, such as a Personal Digital Assistant (PDA), electronic organizer, smart phone, tablet Personal Computer (PC), are capable of processing communication and private information. In addition, the currently available user devices (i.e., mobile terminals) have many different functions. For example, current mobile terminals may include functions or operations, such as a videophone call, an electronic organizer function, a document function, an e-mail function, and an Internet function in addition to initial simple voice call and short message service functions.

In addition, the currently available user devices provide functions for sharing data. That is, user devices support data transmission/reception between them through a connection setting between the user devices to which a data sharing function is applied. For example, through a connection setting between a portable terminal and a television (TV), a dynamic image contained on the portable terminal (user device) may be output to and presented through the TV.

As described above, various electronic devices may be connected through a wired or a wireless network to share data in a recent convergence environment. In order to share data using the user device in the foregoing environment (particularly a wired or wireless environment), a user performs a procedure of checking what are the currently connectable devices, selecting at least two connectable electronic devices, and setting a direction or an order where data is moved between the two connected electronic devices or the two electronic devices to be connected. Accordingly, the user device provides a user interface (UI) for the user's convenience according the procedure for performing a data sharing function.

However, a conventional user device provides a simple user interface of a structure that sequentially selects respective electronic devices for network connection from respective lists. For example, conventionally, a user interface is of a form providing a guide line according to a simple selection procedure. The user selects an electronic device of a transmission side from a list of transmission side electronic devices storing data, selects specific data from a sharing data list in the selected transmission side electronic device, and operates a data sharing function according to a procedure for selection of a reception side electronic device from a reception side electronic device for receiving the selected data.

A related art can perform a more complicated procedure that selects a certain network electronic device by entering a menu that includes multiple depths (or layers), selects data for sharing, and selects a second network electronic device for connection to connect network electronic devices to each other. Because network electronic devices are sequentially selected by entering simple text or through a menu list, the connection structure between network electronic devices with which a user connects, the direction or order of moving the selected data, and the utility of a data sharing function is limited. That is, as only a connection scheme by entering a simple text and menu is supported a visible and intuitive user interface is not provided to the user that allows the user a more robust choice in selection of devices and/or the transfer of data and/or the network connection.

SUMMARY OF THE INVENTION

It is an aim of certain embodiments of the invention to solve, mitigate or obviate, at least partly, at least one of the problems and/or disadvantages associated with the prior art. Certain embodiments aim to provide at least one of the advantages described below.

The present invention has been made in view of the above problems, and provides a method for sharing data between network electronic devices capable of implementing an optimal environment for supporting a data sharing function in a user device, and a user device supporting the same.

The present invention further provides a user interface capable of easily and intuitively recognizing a connection state between connectable network electronic devices for sharing data in a user device, a method for sharing data using the user interface, and a user device supporting the same.

The present invention further provides a method for sharing data between network electronic devices that may implement an environment for supporting a data sharing function of a user device to improve convenience for the user, utilization of the user, and a competitive force (e.g. consumer desirability) of the user device, and a user device supporting the same.

In accordance with an aspect of the present invention, a method for sharing data between network electronic devices includes: searching network electronic devices located in a network connected to a user device when interaction input for performing a data sharing function is sensed; classifying the searched network electronic devices into transmission side network electronic devices and reception side network electronic devices; allotting searched network electronic devices for receiving data to a first region (e.g. a first region of a display or user interface) and allotting searched network electronic devices for transmitting the data to a second region (e.g. a second region of the display or user interface); displaying the devices in respective regions and configuring a user interface for a data sharing function based on the network electronic devices allotted to the first region and the second regions.

In accordance with another aspect of the present invention, a user device includes: a controller for searching network electronic devices located in a network connected to a user device when interaction input for performing a data sharing function is sensed, classifying the searched network electronic devices into transmission side network electronic devices and reception side network electronic devices, and allotting searched network electronic devices for receiving data to a first region (e.g. a first region of a display or user interface) and allotting searched network electronic devices for transmitting the data to a second region (e.g. a second region of the display or user interface); and a display for displaying the devices in respective regions; wherein the user interface is configured for a data sharing function based on the network electronic devices allotted to the first region and the second regions.

In accordance with another aspect of the present invention, a user device includes: a communication module for supporting network connection according to a data sharing function; a display unit for displaying a user interface configured for an operation of the data sharing function; and a controller for searching a network electronic device according to an input for performing the data sharing function, configuring the user interface for a data sharing function based on the searched network electronic devices, and controlling data sharing between transmission side and reception side network electronic devices according to interaction using the user interface.

Another aspect of the invention provides a computer program comprising instructions arranged, when executed, to implement a method, device and/or user interface in accordance with any one of the above-described aspects. A further aspect provides machine-readable storage storing such a program.

BRIEF DESCRIPTION OF THE DRAWINGS

The above and other aspects, and features and advantages of certain exemplary embodiments and aspects of the present invention will be more apparent from the following detailed description in conjunction with the accompanying drawings, in which.

DETAILED DESCRIPTION

Figure 1:
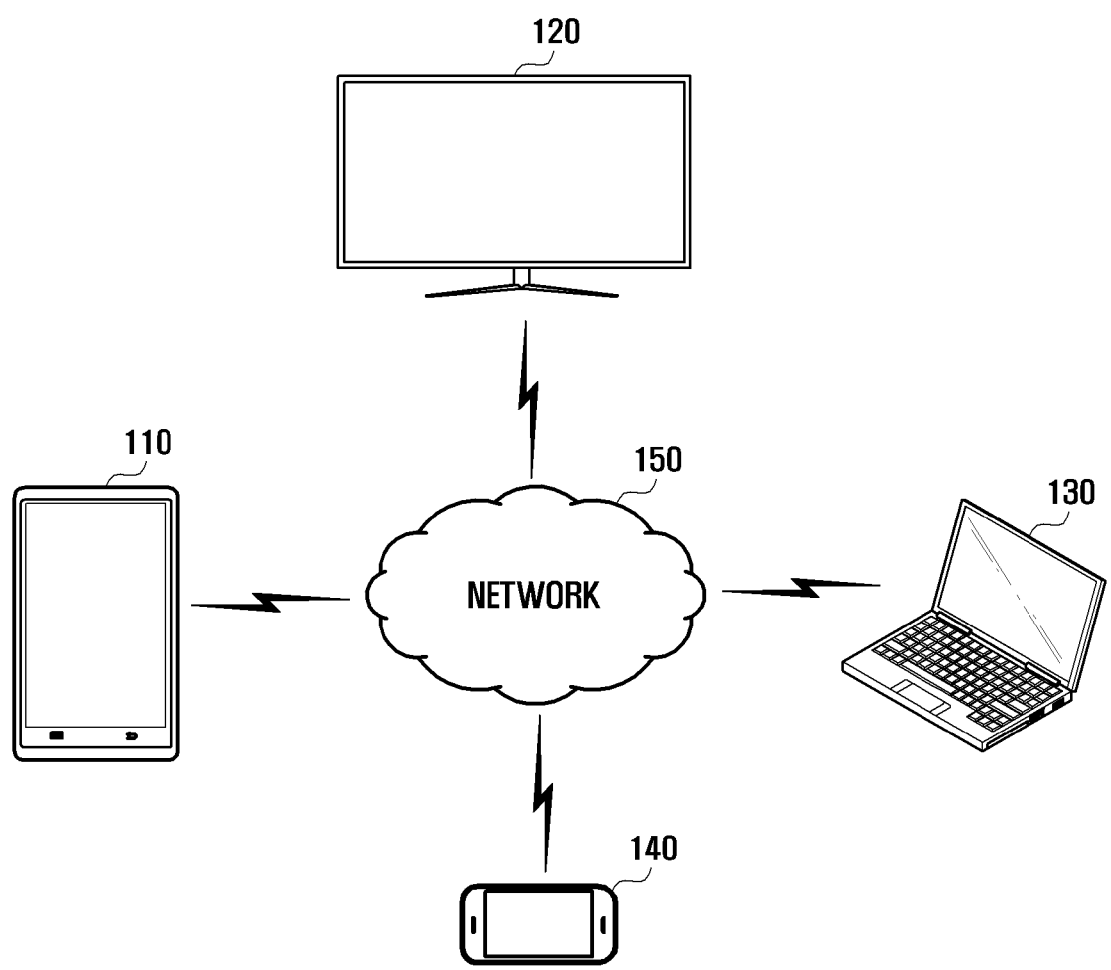
FIG. 1 is a view illustrating a schematic system for describing a data sharing environment according to an embodiment of the present invention.

Exemplary embodiments of the present invention are described with reference to the accompanying drawings. The following description with reference to the accompanying drawings is provided to assist in a comprehensive understanding of exemplary embodiments of the invention as defined by the claims. It includes various specific details to assist in that understanding but these are to be regarded as merely exemplary. Accordingly, those of ordinary skill in the art will recognize that various changes and modifications of the embodiments described herein can be made without departing from the scope of the invention.

The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims.

It is to be understood that the singular forms "a," "an," and "the" include plural referents unless the context clearly dictates otherwise. Thus, for example, reference to "an object" includes reference to one or more of such objects.

The present invention supports a data sharing environment capable of exchanging data between electronic devices (referred to 'network electronic devices') supporting at least one of wired communication and wireless communication for network connection through mutual connection. For example, in embodiments of the present invention, a user device may connect a network with a plurality of network electronic devices in a data sharing environment. Further, embodiments of the present invention may share data of a user device with at least one other network electronic device, share data of another network electronic device, and support sharing data of another network electronic device with another network electronic device through the user device.

The present invention provides a user interface considering convenience and intuition for an operation for data sharing between a plurality of network electronic devices using the user device. In the present invention when performing a data sharing function, a visual item may be expressed, displayed or presented for respective network electronic devices connected through a given network. For example, an item of a two-dimensional or a three-dimensional image form, such as an icon or other graphic, representing an electronic device may be provided. Further, the network electronic devices may be divided into an available network device as a transmission side transmitting data (referred to as 'transmission side electronic device'), and an available network device as a reception side receiving data (referred to as 'reception side electronic device'). The transmission and reception side electronic devices may be expressed, displayed or presented in or through at least two separated regions of the user interface. In a state in which the transmission side electronic device and the reception side electronic device are selected, network connection between corresponding electronic devices are automatically set to support data sharing according to a user interaction.

Accordingly, a configuration of a user device and an operation control method thereof according to an embodiment of the present invention will be described with reference to the accompanying drawings. However, a configuration of a user device and a control method according to an embodiment of the present invention are not limited to following the contents, but are applicable to various embodiments based on the following exemplary embodiments.

FIG. 1 is a view illustrating a schematic system for describing a data sharing environment according to an embodiment of the present invention.

Referring to FIG. 1, a system of data sharing of the present invention includes a plurality of network electronic devices 110, 120, 130, and 140 and a network 150 for connecting the illustrated devices according to a communication scheme among the illustrated network electronic devices 110, 120, 130, and 140.

In an embodiment of the present invention, the network electronic devices 110, 120, 130, and 140 may include various information and communication devices, multimedia devices, display devices, and application devices thereof connected to a given network 150 and for supporting a data sharing function. For example, the network electronic device includes electronic devices, such as Personal Computer (PC), Smart Phone, Portable Multimedia Player (PMP), digital broadcasting player, music player, Personal Digital Assistant (PDA), Digital Camera, portable game terminal, Television (TV), Monitor, Desktop computer, laptop computer, Large Format Display (LFD), Digital Signage (DS), media pole as well as mobile communication terminals operating based on respective communication protocols corresponding to various communication systems.

In an embodiment of the present invention, the network 150 is representatively implemented based on Digital Living Network Alliance (DLNA) by way of example. The DLNA indicates a protocol capable of freely sharing data such as music, still images, or dynamic images between various network electronic devices through a network 150. Network electronic devices supporting the DLNA may share mutual data through the network 150.

Meanwhile, in an embodiment of the present invention, a data sharing function indicates a function capable of sharing data with other network electronic devices by wireless connection anytime and anywhere using a user device, or controlling wireless connection between other network electronic devices to share data. Accordingly, the user may share, play, or store data stored in a network electronic device to which a data sharing function is applied. For example, the user transmits dynamic image data stored in the user device through a TV wireless network connection to enable playback and output by a TV.

In the meantime, a user device according to the present invention provides a user interface for convenience and intuition according to a data sharing function. The user interface according to the present invention may include a first region indicating a source network electronic device (namely, transmission side network electronic device) having data to be shared, a second region indicating a target network electronic device (namely, reception side network electronic device) receiving the shared data, and an indicator (e.g., a bitmap) indicating a direction in which data is transmitted. In particular, the first region and the second region of the present invention may express three-dimensional images capable of identifying various network electronic devices searched in the user device. The network electronic devices arranged in the first region and the second region may perform navigation according to a user interaction. A detailed configuration of a user interface of the present invention will be described.

In an embodiment of the present invention, music files stored in a laptop computer or a desktop computer may be played and output without storing them in the user device. A still image or a dynamic image stored in the user device may be directly played and output through a network connected TV without separate connection procedure such as TV-OUT in the user device. A dynamic image of a network connected laptop computer in the user device is forwarded to a network connected TV to be played and output.

Figure 2:
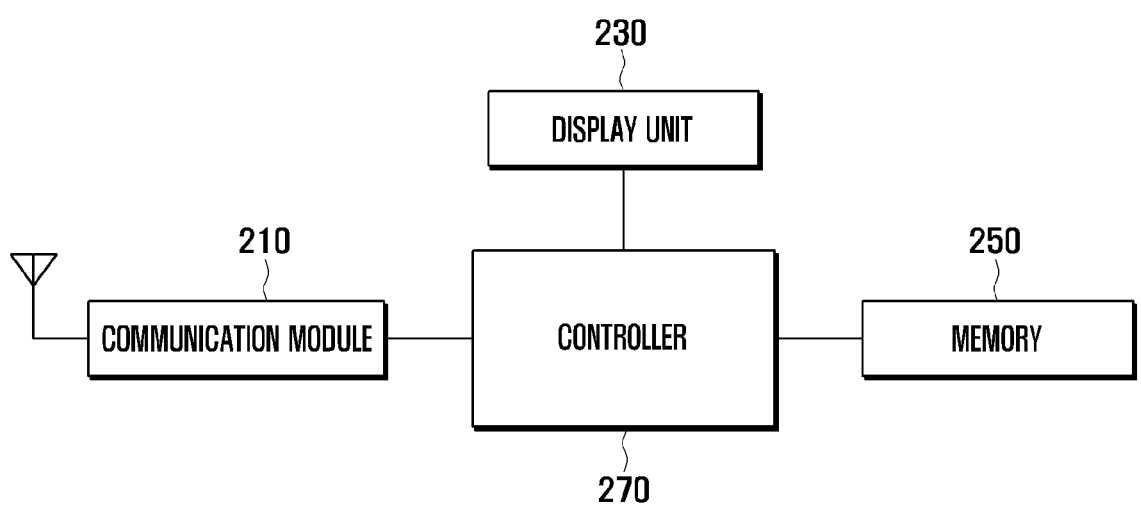
FIG. 2 is a block diagram schematically illustrating a configuration of a user device according to an embodiment of the present invention.

FIG. 2 is a block diagram schematically illustrating a configuration of a user device according to an embodiment of the present invention.

Referring to FIG. 2, a user device of the present invention includes a communication module 120, a display unit 230, a memory 250, and a controller 270. Although the user device may include an audio processor with a microphone and a speaker, a digital broadcasting module for receiving and playing digital broadcasting (e.g., Digital Multimedia Broadcasting (DMB) or Digital Video Broadcasting (DVB)), a camera module for photographing still images and dynamic images of a subject, at least one near distance communication module for supporting a communication function based on near distance wireless communication (e.g., BLUETOOTH communication), Infrared Data Association (IrDA) communication, Radio Frequency Identification (RFID) communication, and Near Field Communication (NFC), a description and drawings thereof are omitted as these features and functions are well-known in the art and their description, herein, may obscure the invention claimed.

The communication module 210 is a module for supporting network communication based on DLNA, for example. In particular, the communication module 210 supports network connection with another network electronic device by wired or wireless communication. Accordingly, data transmission and reception according to data sharing may be performed. In an embodiment of the present invention, the communication module 210 transmits and receives data by wired communication or wireless communication with other network electronic devices through an Access Point (AP) (not shown) of a network 150 (see FIG. 1).

The display unit 230 may display an operational state of the user device and data associated with performing operation thereof. For example, the display unit 230 may express an execution screen of applications supported from a user device. For example, the execution screen may represent screens such as home screen of the user device, a message function, a search function, a communication function, an electronic book (e-book) function, a still image/dynamic image playback function, a moving broadcasting playback function, a music playback function, a game function, etc. In the embodiment of the present invention, the display unit 230 may provide a user interface (UI) for convenience and intuition according to network connection between network electronic devices during an operation of a data sharing function. In particular, the display unit 230 may separately express network electronic devices as one of a transmission side electronic device and a reception side electronic device through at least two different regions during execution of a data sharing function of the user device. An example of a screen according to a user interface provided for an operation of a data sharing function from the display unit 230 will be described below.

Further, in an embodiment of the present invention, a Liquid Crystal Display (LCD), or similar type display device, may be generally used as the display unit 230. However, other display devices such as Light Emitting Diode (LED), Organic LED (OLED), or Active Matrix OLED (AMOLED) may be used. Further, when the display unit 230 displays an execution screen (e.g., provision screen of network electronic devices according to execution of a data sharing function), it may provide a landscape mode or a transverse mode according to a rotation direction (output orientation) of the user device. The display unit may include an interface supporting touch based input. For example, the display unit 230 may support a touch based on user interaction input by a touch screen arrangement and create and transfer an input signal according to the user interaction to the controller 270.

The memory 250 stores various programs and data executed and processed in the user device, and may be configured by at least one nonvolatile memory (not shown) and a volatile memory (not shown). In the present invention, the nonvolatile memory may become a Read Only Memory (ROM), or flash memory, and the volatile memory may become Random Access Memory (RAM). Further, the memory 250 may continuously or temporarily store an operating system of the user device, programs and data associated with a display control operation of the display unit 230, programs and data associated with an input control operation using the display unit 230, and programs and data associated with a data sharing function control operation of the user device.

Further, the memory 250 may store music files, dynamic image files, still image files, and document files. Moreover, the memory 250 may store a plurality of imaged items to intuitively separate various network electronic devices. Further, the memory 250 may store various setting information for a data sharing function operation of the present invention. In the present invention, the setting information may have information with respect to supporting the landscape mode or the transverse mode of a screen (e.g., user interface) according to a data sharing function displayed on the display unit 230.

The controller 270 controls an overall operation of the user device. In particular, the controller 270 may control an operation associated with a data sharing function operation of the present invention. For example, the controller 270 controls execution of a data sharing application, and controls a search of peripheral network electronic devices performed through the communication module 210 during execution of the data sharing application. Further, the controller 270 allots at least one network electronic device capable of transmitting data among searched network electronic devices to a first region, allots at least one network electronic device capable of receiving and outputting data to a second region, and arranges a two or three-dimensional item indicating respective network electronic devices allotted to the first region and the second region to control a configuration of the user interface.

Further, the controller 270 selects a source network electronic device for data sharing in the first region, determines a target network electronic device for data sharing in the second region, and controls data sharing according to the user interface, for example by moving data from a source network electronic device of the first region to a target network electronic device of the second region.

A detailed control operation of the controller 270 will be described in an example of an operation of the user device and a control method thereof with reference to following drawings.

Further, the controller 270 may control various operations associated with a general function of the user device as well as the foregoing function. Further, during execution of a certain application, the controller 270 may control operation of the certain application and corresponding screen display. Further, the controller 270 receives an input signal corresponding to various input schemes supported from a touch based input interface (e.g., a touch screen of display unit 230; a key input from a keyboard or keypad, not shown in the figures) and controls a function operation according thereto. Further, the controller 270 may control transmission and reception of various data based on wired communication or wireless communication.

FIGS. 3 to 6 are views illustrating an exemplary user interface supported when sharing data in a user device according to an embodiment of the present invention.

A screen configuration of the user interface, as illustrated in FIGS. 3 to 6, may be expressed by a type of a user device, a size of the display unit, and a user setting scheme.

As illustrated in FIGS. 3 to 6, a user interface of the present invention provides space images 300, 400, 500, and 600, respectively, wherein at least two items corresponding to network electronic devices may be provided on the space images 300, 400, 500, and 600 through corresponding divided regions. In this case, respective items provided through at least two regions may be in the form of a two or three-dimensional still image or dynamic image indicating forms of respective electronic devices. The items may be expressed in the form of augmented reality by a combination of the space images 300, 400, 500, 600 and the two or three-dimensional image. That is, in the user interface supported by the present invention, a direction with respect to a direction of moving data may be visibly expressed through animation. A transmission side network electronic device and a reception network electronic device may be expressed using an image being a symbol of the network electronic device. In the present invention, at least two regions may include first regions 310, 410, 510, 610 indicating a reception side electronic device for receiving data, and second regions 330, 430, 530, or 630 indicating a transmission side electronic device being a subject transmitting data by the data sharing function.

At least one item corresponding to a reception side electronic device is assigned to the first regions 310, 410, 510, and 610, and at least one item corresponding to a transmission side electronic device is assigned to the second regions 330, 430, 530, 630. In cases of FIG. 3, FIG. 4, and FIG. 6, a plurality of items with respect to a plurality of network electronic devices are provided to the first region 310, 410, and 610, and a plurality of items are provided to the second regions 330, 430, and 630. In a case of FIG. 5, one item with respect to one receiving network electronic device is provided to the first regions 510, and one item with respect to one transmitting network electronic device is provided to the second regions 530.

Figure 3:
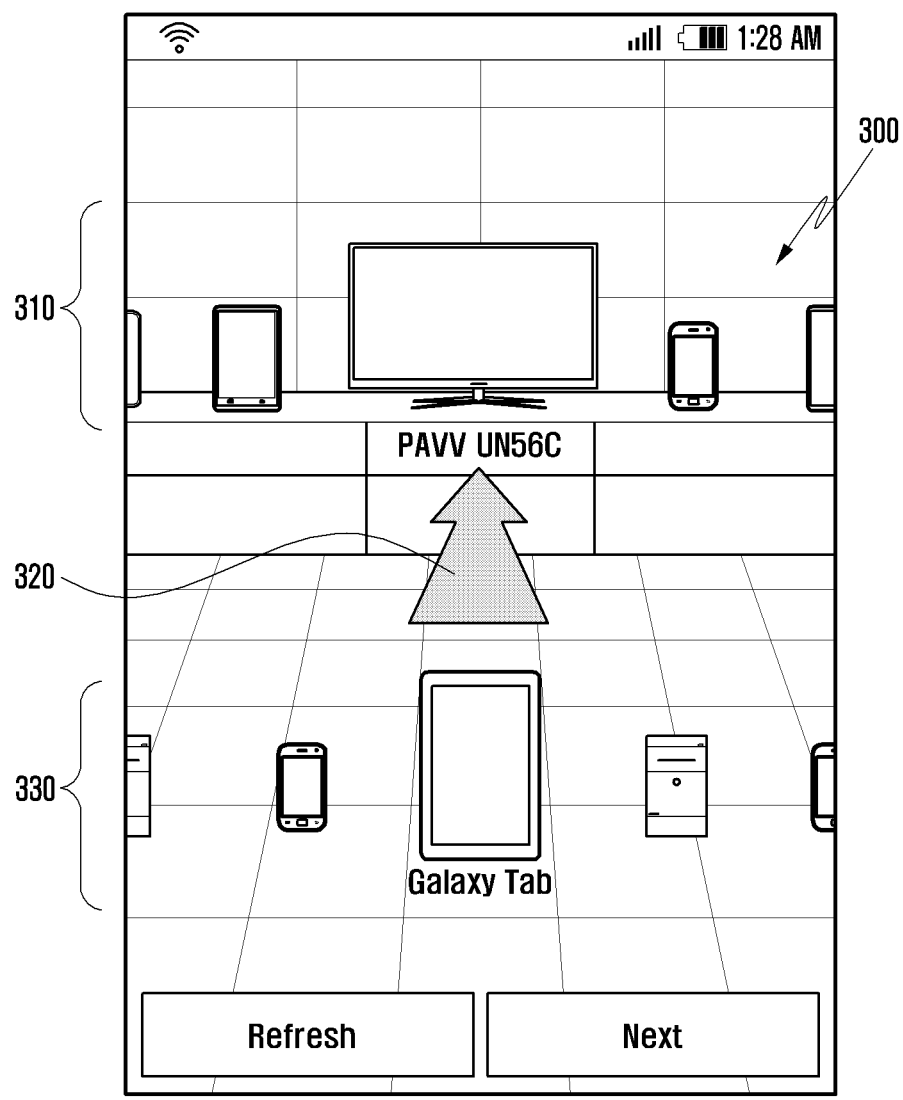
FIGS. 3 to 6 are views illustrating a user interface supported when sharing data in a user device according to an embodiment of the present invention.
Figure 4:
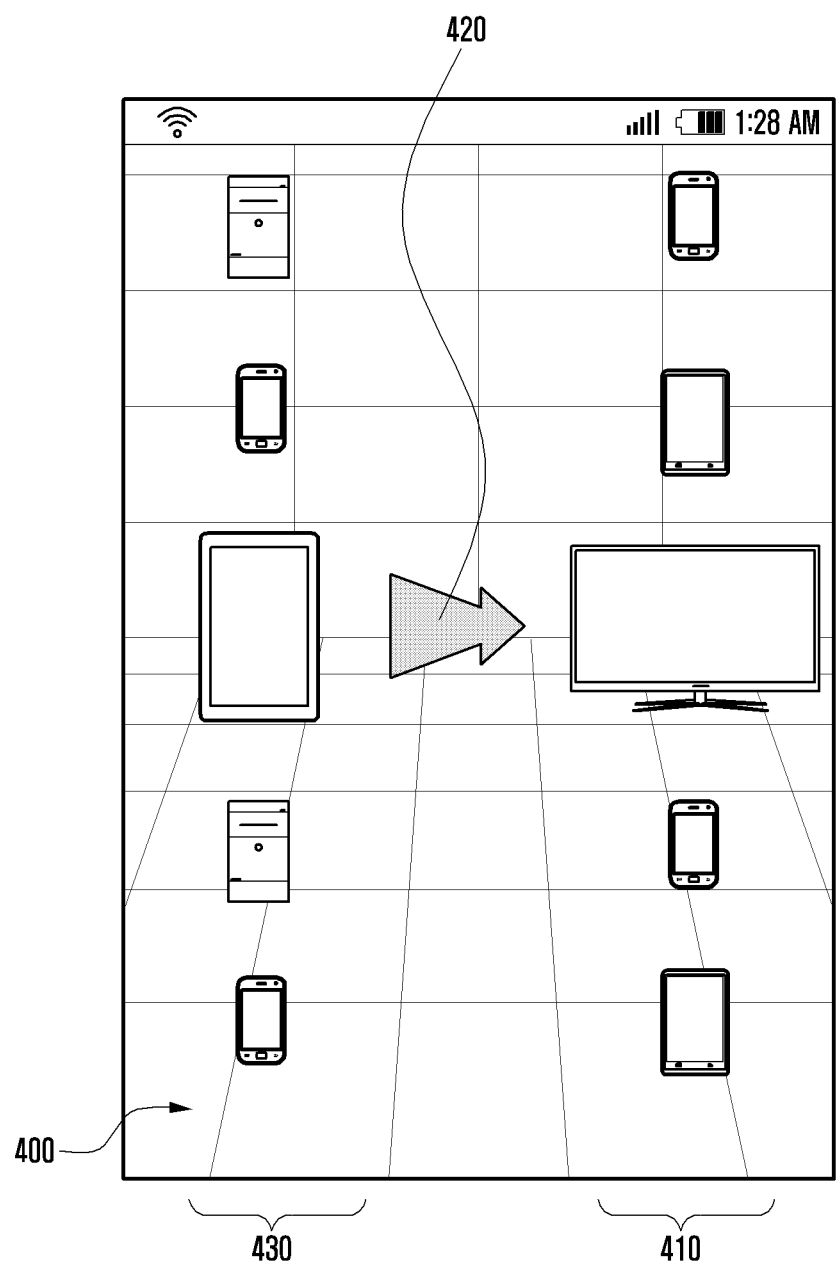
Figure 5:
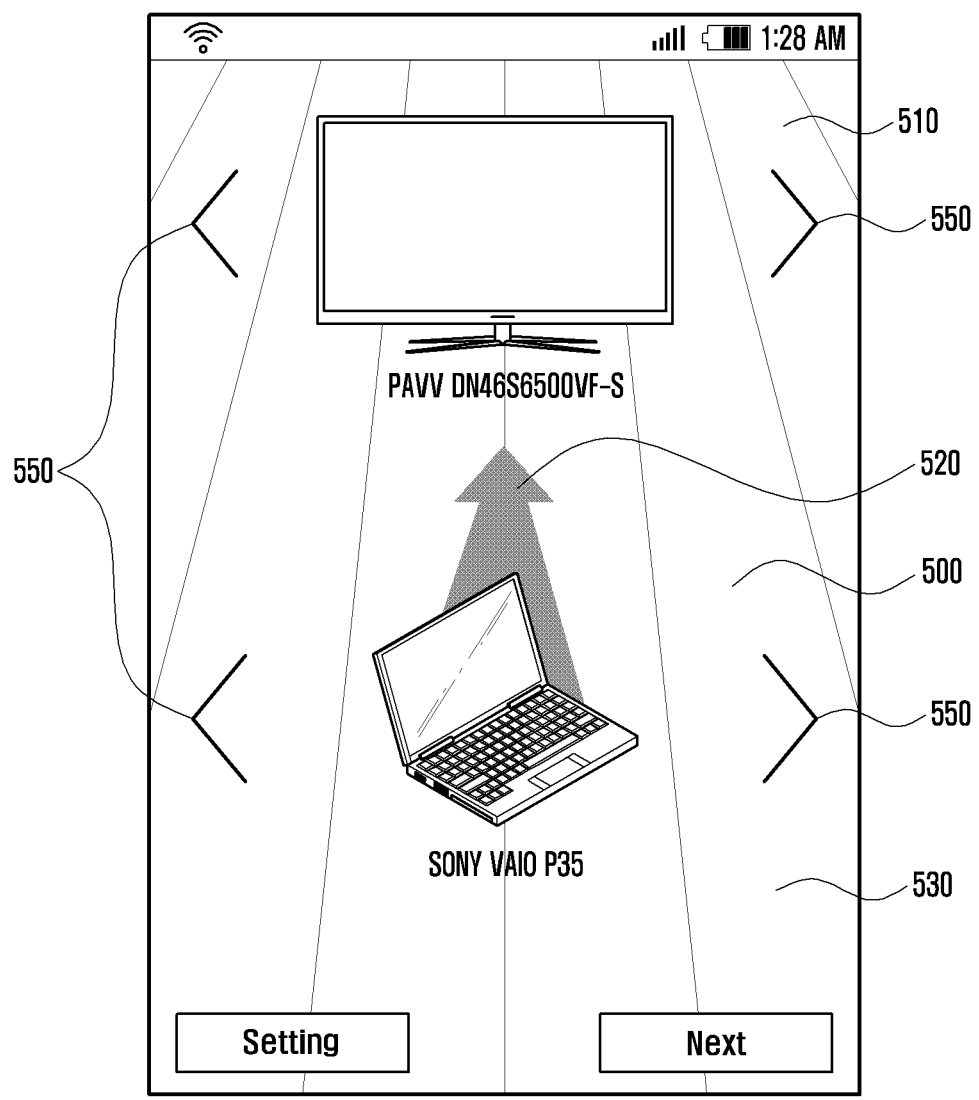

In an embodiment of the present invention, as shown in FIGS. 3 to 5, bitmap images 320, 420 and 520 indicating a direction between items of the first regions 310, 410, and 510 and items of the second regions 330, 430, 530 may be expressed. The bit map images 320, 420, 520 may be items for illustrating a transmission direction, order, and configuration of data between the transmission side network electronic device and the reception side network electronic device.

In an embodiment of the present invention, as shown in FIGS. 3 and 4, in a scheme for providing a plurality of items to the first regions 310 and 410 and the second regions 330 and 430, they may be provided in a floating pattern wherein an enlarged item is located at a center part of each region to easily identify a currently selected network electronic device. In a case of FIG. 3, network electronic devices having the same attribute (e.g., attribute according to separation of a transmission side and a reception side) are horizontally arranged according to their roles to control a wheel-based scroll, and the connected network electronic devices may be vertically arranged. Further, in a case of FIG. 4, network electronic devices having the same attribute are vertically arranged in respective regions 410 and 430 to control scrolling, and the connected network electronic devices are horizontally arranged.

In an embodiment of the present invention, as shown in FIG. 5, when one item is provided to the first region 510 and the second region 530, provided is a navigation item 550 (directional arrows horizontally positioned) indicating that additional network electronic devices are arranged right and left to provide a navigation item 550. Accordingly, the user may change an item through input of interaction in a navigation item 550 in the first region 510 or gesture input in the second region 530, slide, flick, drag and drop.

Figure 6:
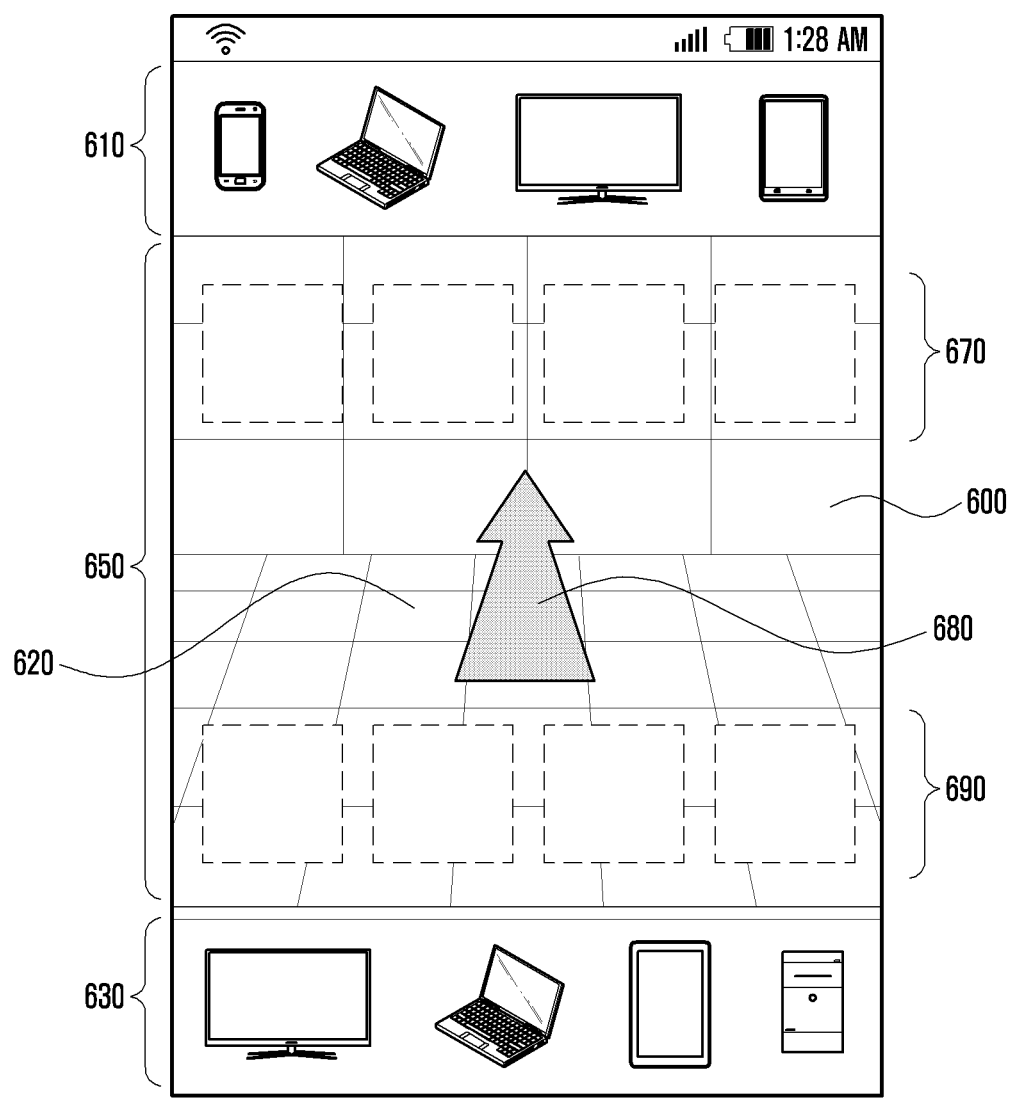

Moreover, in an embodiment of the present invention, the user may optionally connect at least two network electronic devices in a 1:1, 1:N, N:N, or N:1 configuration to share data. Accordingly, for convenience for the user, as shown in FIG. 6, except for the first region 610 and the second region 630, an item arrangement region 650 in which an item of a transmission side network electronic device and an item of a reception side network electronic device are arranged may additionally be provided. The item arrangement region 650 may be divided into a reception item arrangement space 670 registering items of a plurality of reception side network electronic devices and a transmission item arrangement space 690 registering an item of a transmission network electronic device. A bitmap image 680 having a direction as illustrated previously may be provided between the reception item arrangement space 670 and the transmission item arrangement space 690. In the present invention, the transmission item arrangement space 670 and the reception item arrangement space 690 may be divided according to whether a registered item is an item of the first region 610 or an item for a second region 630.

Accordingly, when the user inputs interaction operations (e.g., gesture such as flick, drag & drop) moving a first item with respect to at least one network electronic devices to the item arrangement region 650 in the first region, a reception item arrangement space 670 may be formed according to the number of at least one first item. Further, when the user inputs an interaction (an input) operation moving a second item with respect to at least one network electronic device to the item arrangement region 650 from region 630, a transmission item arrangement space 690 may be formed according to the number of at least one second item. For example, for the purposes of describing the invention claimed, a configuration of one transmission side network electronic device and three reception side network electronic devices are available in the network. That is, in this case, the user connects network electronic devices in a 1:3 scheme to operation a data sharing function. Accordingly, the user may move three items with respect to three network electronic devices determined in the first region 610 to the item arrangement region 650. Three reception item arrangement spaces may be activated in the item arrangement region 650 to express corresponding items. Further, the user may move one item with respect to one network electronic device determined in the second region 630 to the item arrangement region 650. Accordingly, one transmission item arrangement space 690 may be activated in the item arrangement region 650 to express a corresponding item.

FIG. 6 shows a case where a plurality of items is provided in each of the first region 610 and the second region 630. However, in a case of a scheme as shown in FIG. 6, one item and one navigation item may be expressed in the first region 610 and the second region 630.

In addition, an embodiment of the present invention may provide a guide line corresponding to 1:1, 1:N, N:N, or N:1, and may provide items with respect to network connectable, namely searched network electronic devices without separation of the first region and the second region. The guide line may comprise two or more displayed regions or positions in which items indicating searched network electronic devices may be placed, and items indicating directions representing directions of data transmission between network electronic devices. In this case, the user may register an item for transmission and an item for reception in a registered region of items according to the selected guide line to configure network connection of network electronic devices. This embodiment will be illustrated in FIGS. 7 to 9.

Figure 7:
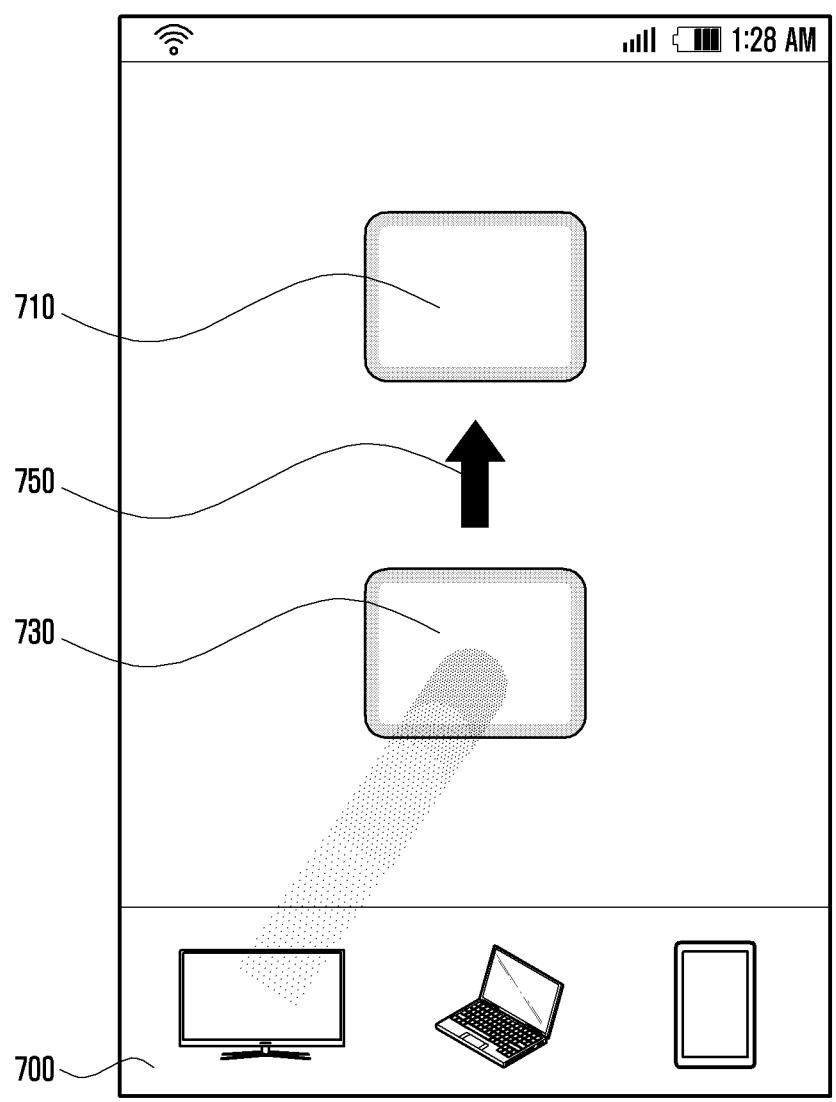
FIGS. 7 to 9 are views illustrating another example of a user interface supported when sharing data according to an embodiment of the present invention.
Figure 8:
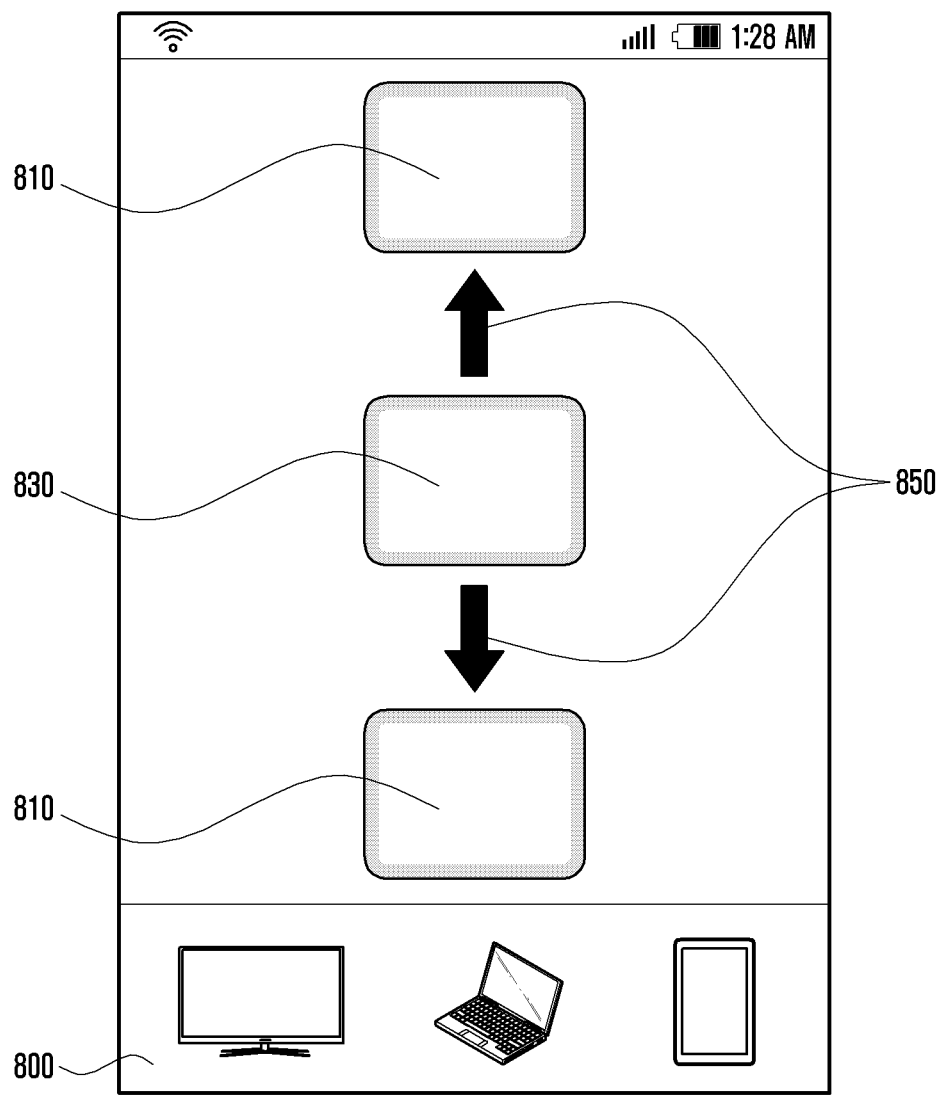
Figure 9:
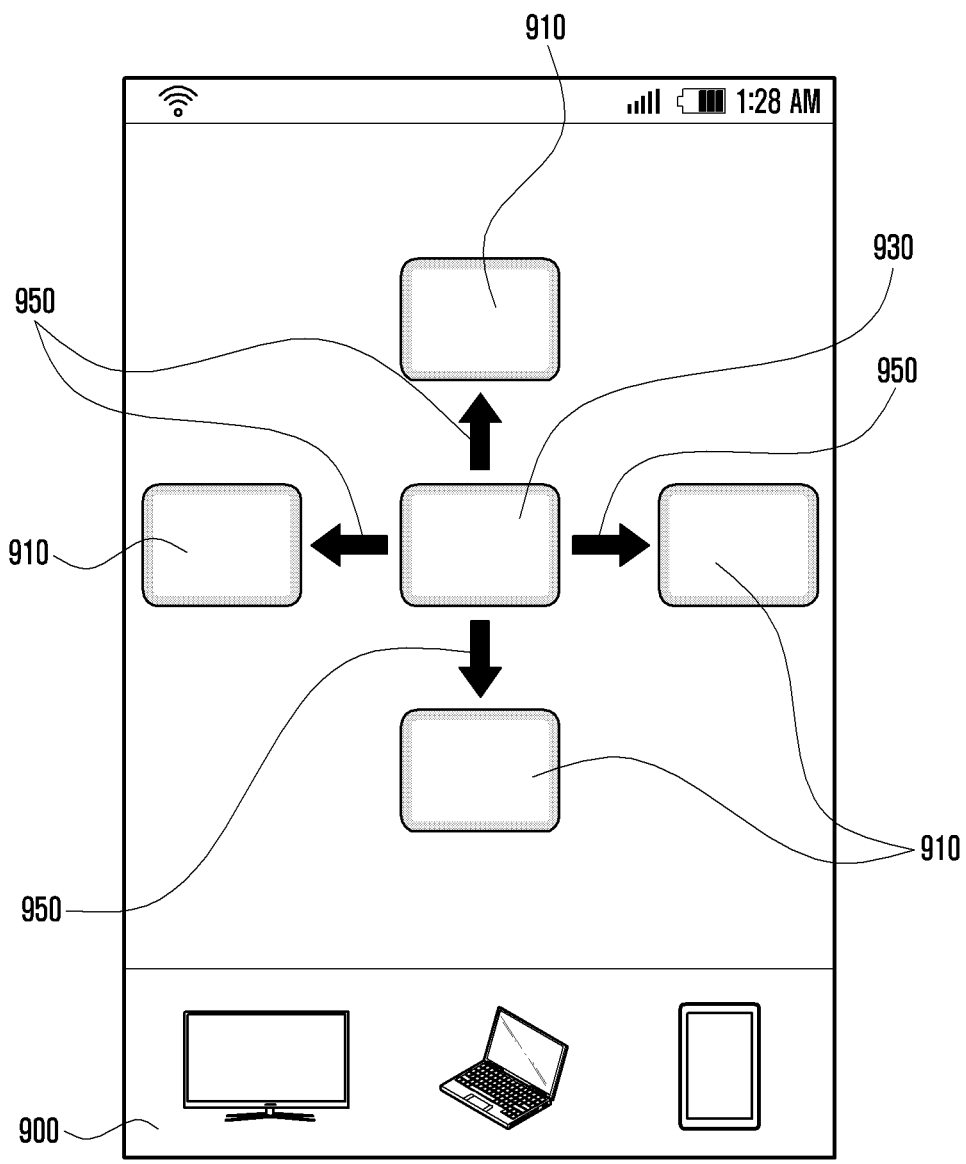

FIGS. 7 to 9 are views illustrating another example of a user interface in accordance with the principles of the invention, for sharing data in a user device.

FIG. 7 illustrates a case where a guide line for network connection in a 1:1 scheme is provided. FIGS. 8 and 9 illustrate cases where a guide line for network connection in a 1:N scheme.

As shown in FIGS. 7 to 9, a user interface of the user may provide a guide line according to one of a 1:1 scheme, a 1:N scheme, an N:N scheme, or an N:1 scheme. In the present invention, the guide line may be divided into transmission item arrangement spaces 730, 830, and 930 and reception item arrangement spaces 710, 810, and 910 as an item arrangement region as illustrated previously. Further, at least one bitmap image 750, 850, and 950 indicating a direction may be provided between transmission item arrangement spaces 730, 830, and 930 and the reception item arrangement spaces 710, 810, and 910. Further, as shown in FIGS. 7 to 9, items with respect to network electronic devices searched for network connections may be provided through one item region 700 without separation of a region for a transmission side electronic device and a region for a reception side electronic device.

FIG. 7 illustrates a case where a guide line in a 1:1 relationship for establishing a direct connection between a transmission side device 730 and a receiving side device 710.

Referring to FIG. 7, the user registers a transmission side item in a transmission item arrangement space 730 according to the guide line in a 1:1 scheme, and registers a reception side item in a reception item arrangement space 710 to configure a network connection. For example, the user may select an item of a transmission side network electronic device for data sharing from an item region 700 to which items indicating searched network electronic devices are provided. The user may input an interaction (e.g., drag and drop gesture) to designate a selected transmission item in space 730. Accordingly, the transmission item arrangement space 730 may be activated to illustrate the corresponding selected item. Further, the user may select a reception side network electronic device for data sharing from the item region 700. Similarly, the user may input an interaction to move the selected item to the reception item arrangement space 710. Accordingly, the reception item arrangement space 710 may be activated to illustrate the corresponding selected item. In this case, as shown in FIG. 7, a bitmap image 750 illustrates a transmission direction from a transmission side item to a reception side item. That is, the bitmap image 750 may show the direction of transmission between the transmission item arrangement space 730 and the reception item arrangement space 710.

FIG. 8 illustrates a case where a guide line in 1:2 as the user selects a 1:2 scheme. FIG. 9 illustrates a case where a guide line in 1:4 as the user selects a 1:4 scheme.

Referring to FIGS. 8 and 9, the user registers one transmission side item in transmission item arrangement spaces 830 and 930, respectively, and registers a plurality of reception side items in the reception item arrangement spaces 810 and 910, respectively, according to a procedure as illustrated in a description with reference to FIG. 7. In this case, referring to FIGS. 8 and 9, a plurality of bitmap images 850 and 950 illustrate a transmission direction to respective reception side items from a transmission side item according to the number of reception side items. That is, the bitmap images 850 and 950 may be expressed for the transmission item arrangement spaces 830 and 930 and the reception item arrangement spaces 810 and 910, respectively.

Although not shown in FIGS. 7 to 9, a space image may be provided based on a real space as illustrated previously as a background. In this case, the guide line illustrated in FIGS. 7 to 9 may be expressed on the space image.

Figure 10:
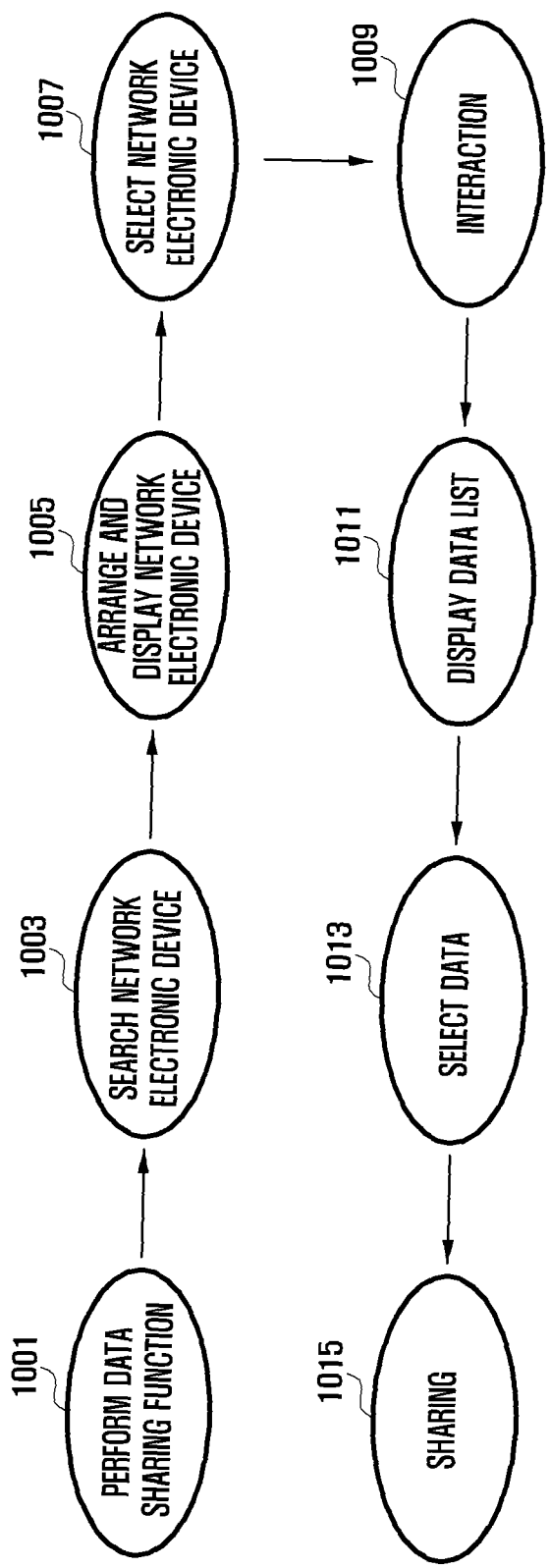
FIGS. 10 and 11 are views illustrating examples of an operation for a data sharing function according to an embodiment of the present invention.
Figure 11:
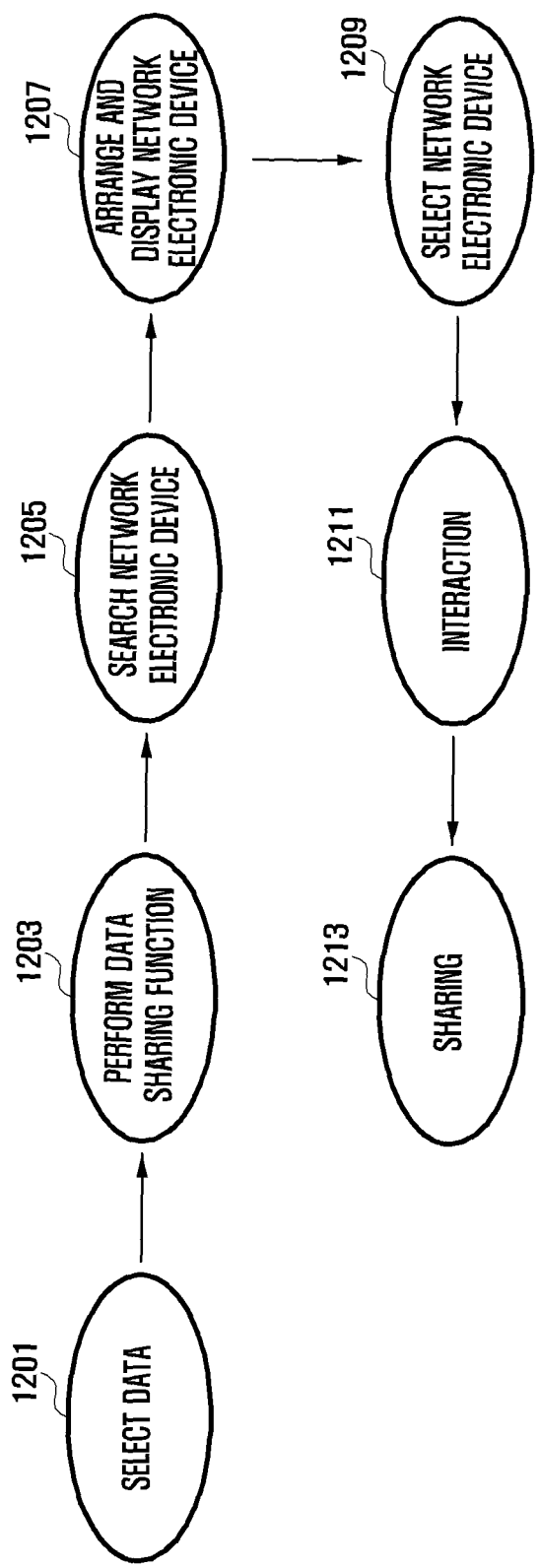
Figure 12:
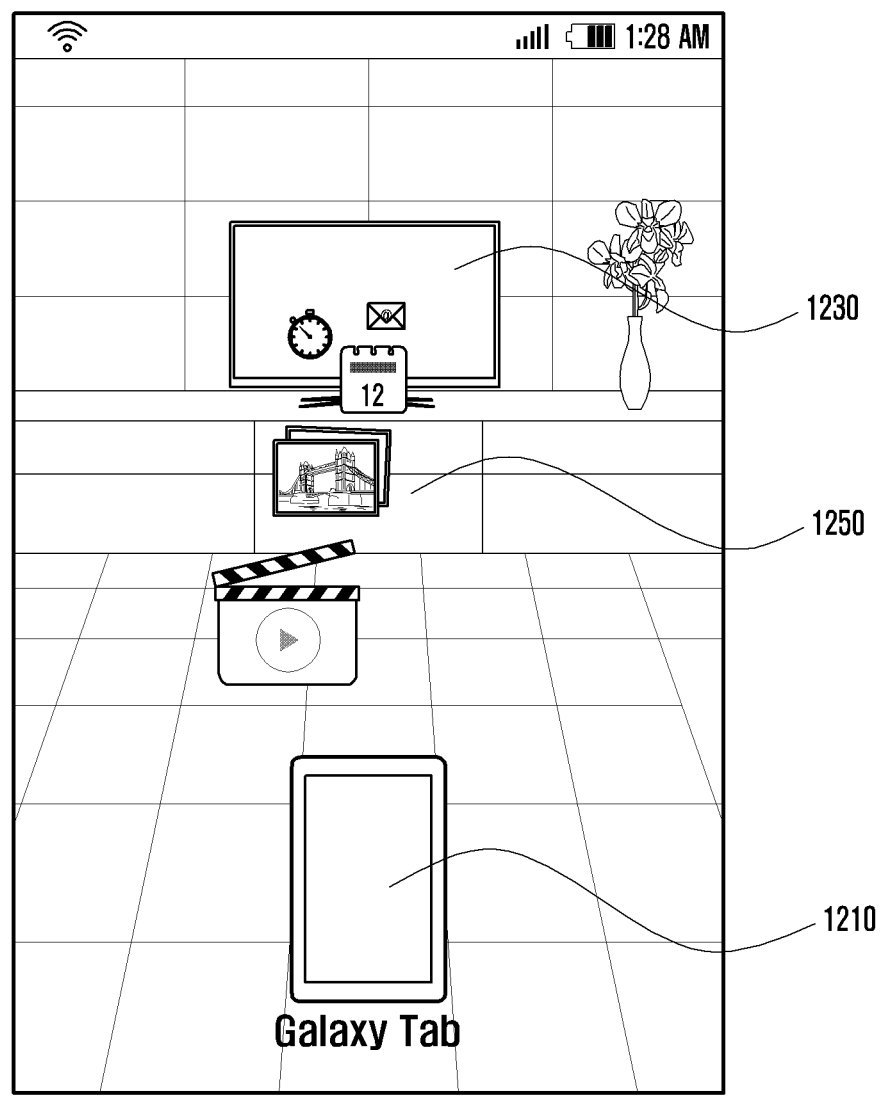
FIG. 12 is an example of a screen in which data sharing is executed when connecting network electronic devices according to an embodiment of the present invention.

FIGS. 10 and 11 illustrate processing flow examples for a data sharing function in a user device according to an embodiment of the present invention. FIG. 12 is an example of a screen in which data sharing is executed when connecting network electronic devices according to an embodiment of the present invention.

FIG. 10 illustrates an example of operating a data sharing function when certain data is selected after execution of a data sharing function. First, the user performs a data sharing function using a user device (1001). For example, the user may operate the user device to control execution of a data sharing application. Then, the user device performs a data sharing function in response to a performing request from the user, and may search peripheral network electronic devices while performing a function associated with the user request (1003).

Next, the user device may divide attributes of a searched network electronic device into a transmission side network electronic device and a reception side network electronic device, arrange and display the transmission side electronic devices and the reception side network electronic devices in different regions (e.g., first and second regions) (1005). In this case, the items arranged and displayed in the first region and in the second region may be illustrated as a two or three-dimensional image separated according to types of respective searched network electronic devices. For example, the item may be provided as a two or three-dimensional image capable of expressing a corresponding device type according to a type of notebook, smart phone, or TV. An example of a three-dimensional representation of items was presented in FIGS. 3 to 6.

Subsequently, the user may select and determine a transmission side network electronic device having data to be shared and a reception side network electronic device for transmitting and sharing data based on an item corresponding to respective network electronic devices expressed on the first and second regions (1007). For example, the user device may be selected as both the transmission side network electronic device and the reception side network electronic device. That is, the user may share with another network electronic device data of the user device or data of another network electronic device with the user device. The user may alternatively select the transmission side network electronic device and the reception side network electronic device to be any other network electronic devices except for the user device. That is, the user may share data of a first network electronic device with a second network electronic device; the first and second devices not being the user device.

Next, the user may input an interaction for data sharing based on the previously selected network electronic devices (1009). For example, the user may input an interaction (e.g., gesture such as flick or drag and drop) moving a transmission side item to a reception side item in a given example of the user interface as illustrated in FIG. 3. Then, the user device may internally control network connection between a network electronic device of a transmission item and a network electronic device of a reception side item. Although it is assumed that the network connection is achieved based on DLNA, it may be achieved using other types of network scheme (e.g., Bluetooth communication scheme, Wi-Fi direct communication scheme) supported from respective network electronic devices.

Subsequently, the user device may display a data list associated with sharing data in response to the interaction (1011). In this case, the sharing data may become data of a network electronic device selected as the transmission side item. If the network electronic device selected as the transmission side item is the user device, the data may be data stored in the user device. When a network electronic device selected as the transmission side item is another network electronic device connected to the user device, the data may be data stored in the another network electronic device.

Then, the user may select certain data to be shared from the data list provided (1013). Then, the user device may control sharing of the selected certain data in response to data selection of the user (1015). That is, the user device may transmit the selected data to a network electronic device corresponding to a network connected reception side item in order to share the selected certain data. In this case, the data sharing may be achieved by playing the data (e.g., dynamic image, still image, music file) through a reception side network electronic device or by storing the data in the reception side network.

An example of a screen provided to the user device according to data sharing is illustrated in FIG. 12. As shown in FIG. 12, an item 1210 representing the transmission side network electronic device (i.e., Galaxy Tab) and an item 1230 representing the reception side network electronic device (i.e., a television) may be expressed in an image of augmented reality form. Further, additional information 1250 associated with data sharing according to network connection between the transmission side network electronic device and the reception side network electronic device may be provided. In the present invention, the additional information may be expressed as at least one item representing a thumbnail of transmitted data, and advancing a degree of data sharing according to data sharing procedure.

Referring to FIG. 11, FIG. 11 illustrates an example of a procedure for a data sharing function when certain data to be shared is firstly selected. First, the user may select certain data for data sharing among data previously stored in a user device (1201). Next, the user may perform a data sharing function for sharing the selected data (1203). Then, the user device may perform the data sharing function in response a request of the user and search network electronic devices in response to the data sharing function request (1205). The network electronic devices may include peripheral network electronic devices (e.g. devices that are in the same network as the user device), or other network electronic devices that are accessible by the user device via one or more networks.

Next, the user device may divide attributes of searched network electronic devices into transmission side network electronic devices and reception side network electronic devices, arrange and display the devices in different regions (e.g., first and second regions) (1207), as previously described.

In this case, the items arranged and displayed in the first region and in the second region may be expressed as three-dimensional images according to types of respective searched network electronic devices. FIG. 12 illustrates an example of a case for sharing data stored in the user device. Accordingly, an item representing the user device may be automatically allotted to a second region in which the transmission side network electronic devices are arranged.

Returning to FIG. 11, the user may select a reception side network electronic device as a subject for sharing the selected certain data from the user device based on respective electronic devices expressed in the first region (1209).

Next, the user may input an interaction for data sharing between the user device and a reception side network electronic device (1211). For example, the user may input gesture such as flick or drag and drop to move a transmission side item (namely, item representing the user device) to a reception side item as an example of the user interface illustrated in FIG. 3. Then, the user device may internally control network connection between the user device and a network electronic device of a reception side item. Although it is assumed that the network connection is achieved based on a DLNA connection, the network connection may is achieved using any of a plurality of network schemes (e.g., Bluetooth communication scheme, Wi-Fi direct communication scheme) supported by the user device and the selected network electronic device.

Then, the user device may control the sharing of a corresponding data in response to data selection of the user (1213). That is, the user device may transmit the certain data to a network electronic device corresponding to a network connected reception side item to share the data. In this case, the data sharing may be achieved by playing the certain data (e.g., dynamic image, still image, music file) through a reception side network electronic device or by storing the data in the reception side network. An example of a screen provided to the user device according to data sharing is illustrated in FIG. 12.

Although not shown and illustrated in FIG. 11, when a data sharing function is performed after sharing data are selected, provided is an item instructing a direction of data to be shared between the transmission side item and the reception side item (see FIG. 3).

Figure 13:
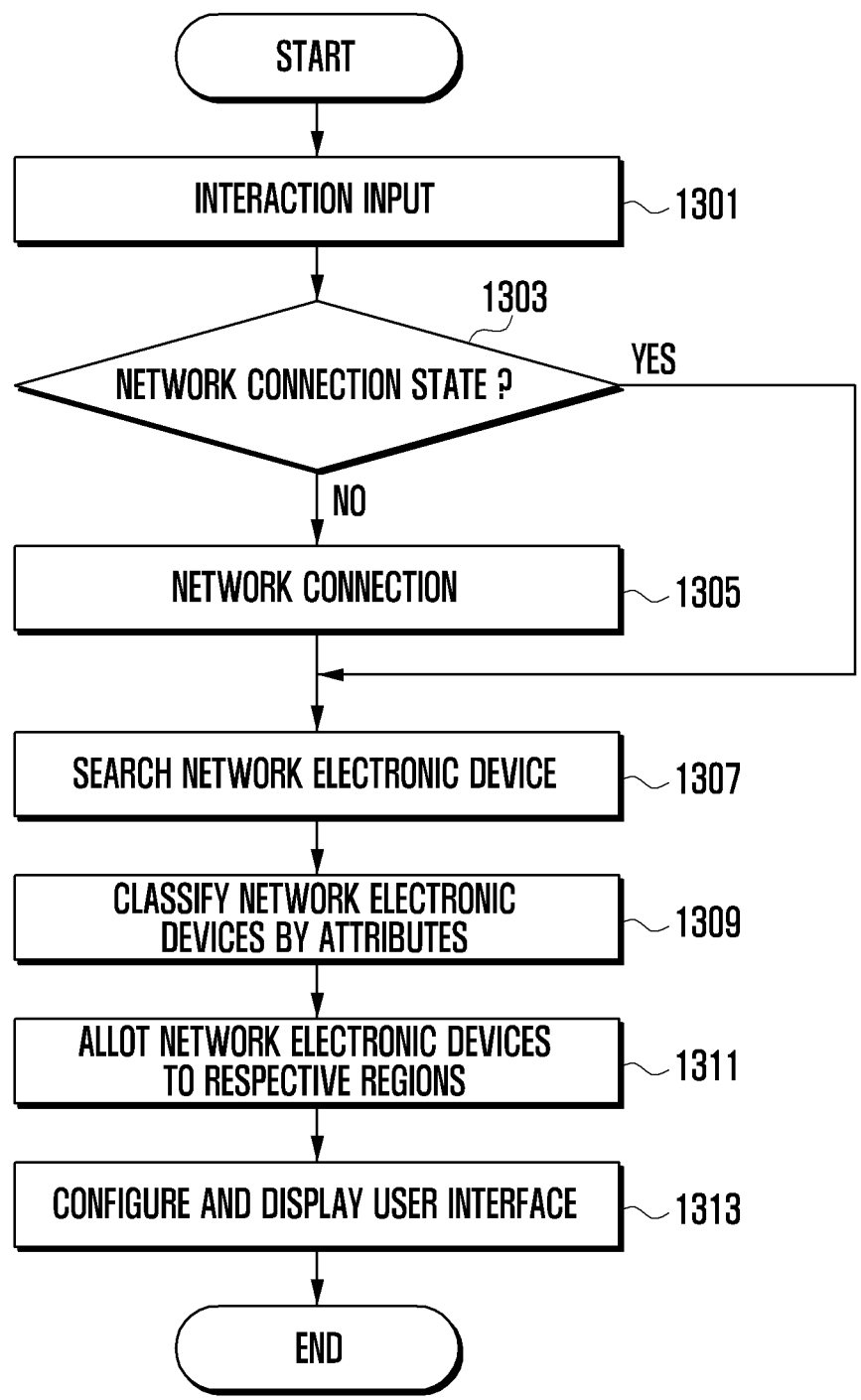
FIG. 13 is a flowchart illustrating a method for operating a data sharing function in a user device according to an exemplary embodiment of the present invention.

FIG. 13 illustrates an exemplary flowchart for performing a data sharing function according to an exemplary embodiment of the present invention.

Referring to FIG. 13, an interaction input for performing a data sharing function is sensed (1301), a controller 270 may check a network connection state of a user device (1303). For example, the controller 270 may check whether the user device connects with a DLNA based network (or other type network connection as previously discussed) through a communication module 210.

Next, when the user device connects with a network (YES of step 1303), the controller 270 goes to step 1307. When the user device does not connect with the network (NO of step 1303), the controller 270 may control network connection (1305).

Subsequently, the controller 270 (FIG. 2) may search network devices near to, or peripheral to, the user device (1307). For example, the controller 270 may search other network electronic devices connecting with the network.

Next, the controller 270 may separate the searched network electronic devices into transmission side network electronic devices and reception side network electronic devices (1309). Further, the controller 270 may allot the network electronic devices by attributes to different regions (e.g., first region and second region) (1311). For example, the controller 270 may allot at least one network electronic device capable of transmitting data among searched network electronic devices to the first region, and allot at least one network electronic device capable of receiving and sharing (playing or storing) data to the second region. In this case, the controller 270 may automatically allot the user device to first region and the second region. That is, the user device may be both a transmission device and a receiving device.

Next, the controller 270 may configure and display a user interface (1313). For example, the controller 270 configures a user interface as illustrated in FIGS. 3 to 6 expressed in the augmented reality using a space image based on an item representing respective network electronic devices allotted to the first and second regions and a bitmap image illustrating a moving direction of data. The bitmap is then displayed on the display unit 230.

Subsequently, the controller 270 may provide a user interface for execution of the data sharing function, and control an overall operation according to data sharing between network electronic devices according to user operation using the user interface. For example, the controller 270 may select a reception side network electronic device for data sharing in a first region according to the user operation and select a transmission side network electronic device for data sharing in the second region. Further, the controller 270 may control an operation associated with data transmission according to user interaction for moving data with respect to a network electronic device of the second region (transmission region) to an item with respect to a network electronic device of the first region (reception region).

It will be appreciated that embodiments of the present invention can be realized in the form of hardware, software or a combination of hardware and software. For example, a method for sharing data between network electronic devices according to an embodiment of the present invention as described above may be implemented in an executable program command form by various computer means and be recorded in a volatile or non-volatile computer readable recording medium. In this case, the computer readable recording medium may include a program command, a data file, and a data structure individually or a combination thereof. Further, the program command recorded in a recording medium may be specially designed or configured for the present invention or be known to a person having ordinary skill in a computer software field to be used.

The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, or flash memory for storing executable program commands. Further, the program command may include a machine language code created by a complier and a high-level language code executable by a computer using an interpreter. The foregoing hardware device may be configured to be operated as at least one software module to perform an operation of the present invention, and vice versa.

It will be appreciated that the storage devices and storage media are embodiments of machine-readable storage that are suitable for storing a program or programs comprising instructions that, when executed, implement embodiments of the present invention. Accordingly, embodiments provide a program comprising code for implementing a device, user interface, or a method as claimed in any one of the claims of this specification and a machine-readable storage storing such a program. Still further, such programs may be conveyed electronically via any medium such as a communication signal carried over a wired or wireless connection and embodiments suitably encompass the same.

As illustrated previously, a method for sharing data between network electronics and an apparatus may provide convenience and intuition of an operation of a data sharing function according to network connection between network electronic devices. In embodiments of the present invention, a user interface may be divided into a first region for displaying a transmission side network electronic device aiming at data sharing and a second region for displaying a reception side network electronic device being a connection target for data sharing.

Additionally, the controller 270 (FIG. 2) can be implemented in programmable hardware, firmware or as software or computer code, executed by a computer or processor, that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the controller or the programmable hardware may include memory components, e.g., RAM, ROM, Flash, etc. that may store or receive software or computer code that when accessed and executed by the computer, processor or hardware implements the processing methods described herein. In addition, it would be recognized that when a general purpose computer accesses code for implementing the processing shown herein, the execution of the code transforms the general purpose computer into a special purpose computer for executing the processing shown herein.

The present invention intuitively expresses respective network electronic devices in the first region and the second region through a three-dimensional item, and support a user interface composed of items indicating a data transmission direction, order, and data advancing state between network electronic devices of the first and second regions. By supporting the user interface, a data sharing function by connection between the network electronic devices may be easily and intuitively operated in the user device.

In the present invention, the user may support more intuitive and comprehensive user environment in a wide use environment (e.g., dynamic image streaming, data transmission between network electronic devices, data sharing setting between a plurality network electronic devices). The data sharing function of the present invention may be implemented in various types of user devices and various network devices corresponding thereto. As illustrated previously, in the present invention, an optimal environment for supporting data sharing function between network electronic devices in a user device. Accordingly, the present invention may improve convenience for the user concerning a data sharing function in the user device and contribute to improvements in utilization and competitive force of the user device.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Although exemplary embodiments of the present invention have been described in detail hereinabove, it should be clearly understood that many variations and modifications of the inventive concepts herein taught which may appear to those skilled in the present art will still fall within the scope of the present invention, as defined in the appended claims.

What is claimed is:

1. A method, operable in a controller, for sharing data between network electronic devices, the method comprising:
  displaying transmission side network electronic devices in a first region of a touch screen of a user device and reception side network electronic devices in a second region of the touch screen, the transmission side network devices and the reception side network devices being detected within a periphery of the user device, wherein displaying the transmission side network electronic devices and the reception side network electronic devices comprises:
    allotting at least one transmission side network electronic device capable of transmitting data to the first region; and
    allotting at least one network electronic device capable of receiving and sharing the data to the second region;
  in response to a scrolling gesture detected across the first region of the touch screen or the second region of the touch screen, scrolling through the transmission side network devices or the reception side network devices respectively;
  in response to a selection of a transmission side network electronic device and a reception side network electronic device, enlarging an icon indicative of the selected transmission side network device and an icon indicative of the selected reception side network device; and
  configuring a user interface for data sharing between the selected transmission side network electronic device and the selected reception side network electronic device, wherein configuring the use interface comprises:
    configuring the first region for at least one item corresponding to the reception side network electronic device, the second region for at least one item corresponding to the transmission side network electronic device, and an item arrangement region for registering an item of the transmission side network electronic device of the second region and an item of the reception side network electronic device of the first region, wherein the item arrangement region comprises a reception item arrangement space for registering the item of the reception side network electronic device from the first region and a transmission item arrangement space for registering the item of the transmission side network electronic device from the second region;

wherein the icon indicative of the transmission side network device and the icon indicative of the reception side network device represent a feature of the transmission side network device and the reception side network device itself according to a type of the transmission side network device and the reception side network device, and wherein the user interface comprises an item representing respective network electronic devices allotted to the first and second regions, a space image for a background image, and a bitmap image indicating a direction for moving data.

2. The method of claim 1, further comprising allotting the user device to the first region and the second region.

3. The method of claim 1, wherein configuring the user interface comprises:
configuring the first region for a plurality of items corresponding to the reception side network electronic device, and the second region for a plurality of items corresponding to the transmission side network electronic device.

4. The method of claim 1, wherein configuring the user interface comprises:
configuring the first region for one item corresponding to the reception side network electronic device, the second region for one item corresponding to the transmission side network electronic device, and a navigation item for switching to another network electronic device in the first regio and the second region.

5. The method of claim 1, further comprising:
forming the reception item arrangement space according to a number of items moving from the first region to the item arrangement region; and
forming the transmission item arrangement space according to the number of items moving from the second region to the item arrangement region.

6. The method of claim 1, wherein configuring the user interface comprises:
configuring the user interface by a guide line according to a connection scheme determined by the user, wherein the configuration by the guide line comprises one item region for the displayed network electronic devices and an item arrangement region for the guide line.

7. The method of claim 6, wherein the item arrangement region comprises a transmission item arrangement space, a reception item arrangement space, and at least one bitmap image between the transmission item arrangement space and the reception item arrangement space indicating a transmission direction of data.

8. The method of claim 1, further comprising sharing data between the selected transmission side network device and the selected reception side network device.

9. The method of claim 1, further comprising:
checking a network connection state of the user device when an input is sensed to determine whether the user device connects with a Digital Living Network Alliance (DLNA) based network, and
controlling network connection when the user device does not connect with the network.

10. A user device comprising:
a communication module to support a network connection;
a touch screen; and
a controller to:
display transmission side network electronic devices in a first region of the touch screen of the user device and reception side network electronic devices in a second region of the touch screen, the transmission side network devices and the reception side network devices being detected within a periphery of the user device by the communication module;
in response to a scrolling gesture detected across the first region of the touch screen or the second region of the touch screen, scroll through the transmission side network devices or the reception side network devices respectively;
in response to a selection of a transmission side network electronic device and a reception side network electronic device, enlarge an icon indicative of the transmission side network device and an icon indicative of the reception side network device; and
configure a user interface for data sharing between the selected transmission side network electronic device and the selected reception side network electronic device, wherein the user interface comprises:
an item representing respective network electronic devices allotted to the first and second regions, a space image for a background, and a bitmap image indicating a moving direction of data,
wherein the icon indicative of the transmission side network device and the icon indicative of the reception side network device represent a feature of the transmission side network device and the reception side network device itself according to a type of the transmission side network device and the reception side network device, and
wherein the first region includes at least one item corresponding to the reception side network electronic device, the second region includes at least one item corresponding to the transmission side network electronic device, and the user interface further includes an item arrangement region for registering an item of the transmission side network electronic device of the second region and an item of the reception side network electronic device of the first region to configure the user interface, wherein the item arrangement region comprises a reception item arrangement space for registering the item of the reception side network electronic device from the first region and a transmission item arrangement space for registering the item of the transmission side network electronic device from the second region.

11. The user device of claim 10, wherein the first region includes a plurality of items corresponding to reception side network electronic devices and the second region includes a plurality of items corresponding to transmission side network electronic devices.

12. The user device of claim 10, wherein the first region includes at least one item corresponding to the reception side network electronic device, the second region includes at least one item corresponding to the transmission side network electronic device, and the user interface further includes a navigation item for switching to another network electronic device in the first region and the second region to configure the user interface.

13. The user device of claim 10, wherein the controller forms the reception item arrangement space according to a number of items moving from the first region to the item arrangement region; and forms the transmission item arrangement space according to the number of items moving from the second region to the item arrangement region.

14. The user device of claim 10, wherein the controller controls the user interface by a guide line in accordance with a connection scheme, the user interface comprises one item region for the network electronic devices, an item arrangement region for the guide line, and at least one bitmap image indicating a transmission direction of data, wherein the item arrangement region is divided into a transmission item arrangement space and a reception item arrangement space.

* * * * *

UNITED STATES PATENT AND TRADEMARK OFFICE
CERTIFICATE OF CORRECTION

PATENT NO. : 9,628,570 B2  
APPLICATION NO. : 13/468479  
DATED : April 18, 2017  
INVENTOR(S) : Park et al.

Page 1 of 1

It is certified that error appears in the above-identified patent and that said Letters Patent is hereby corrected as shown below:

In the Claims

Column 17, Claim 4, Line 37 should read as follows:
--...in the first region and...--

Signed and Sealed this
Thirtieth Day of May, 2017

Michelle K. Lee
*Director of the United States Patent and Trademark Office*